United States Patent
Miki et al.

(10) Patent No.: US 7,848,587 B2
(45) Date of Patent: Dec. 7, 2010

(54) IMAGE-PROCESSING SYSTEM AND IMAGE-PROCESSING PROGRAM

(75) Inventors: Takanori Miki, Kanagawa (JP); Masami Haino, Tokyo (JP); Fuminori Takahashi, Nagano (JP); Hiroaki Komatsu, Nagano (JP)

(73) Assignee: Eastman Kodak Company, Rochester, NY (US)

( * ) Notice: Subject to any disclaimer, the term of this patent is extended or adjusted under 35 U.S.C. 154(b) by 936 days.

(21) Appl. No.: 11/681,801

(22) Filed: Mar. 5, 2007

(65) Prior Publication Data

US 2008/0002900 A1    Jan. 3, 2008

(30) Foreign Application Priority Data

Jun. 30, 2006 (JP) .............................. 2006-182258

(51) Int. Cl.
G06K 9/40 (2006.01)
H04N 5/228 (2006.01)
H04N 5/217 (2006.01)
(52) U.S. Cl. ...................... 382/254; 348/222.1; 348/241
(58) Field of Classification Search ................. 382/254, 382/255, 282, 283; 348/345, 352, 699, 700, 348/222.1, 241, 606, 607
See application file for complete search history.

(56) References Cited

U.S. PATENT DOCUMENTS 7,079,179 B2    7/2006   Sumitomo et al.
7,693,342 B2 *  4/2010   Poon et al. ................. 382/255
2005/0249429 A1* 11/2005   Kitamura ................... 382/255

FOREIGN PATENT DOCUMENTS

JP      2002-288653      10/2002

OTHER PUBLICATIONS

"New Edition of Image Analysis Handbook", editorship of Mikio Takagi, University of Tokyo Press, Sep. 2004.

* cited by examiner

Primary Examiner—Yon Couso
(74) Attorney, Agent, or Firm—Thomas J. Strouse; Peyton C. Watkins (57) ABSTRACT

An image deteriorated by camera shake, or the like, is restored in a short period of time. A ∇J computation section computes an evaluation value J from a deteriorated image G captured by means of photographing, a restored image F, and a PSF computed from an angular velocity detected by an angular velocity sensor, and further computes ∇J. When the square of norm of ∇J exceeds a threshold value, there is iterated processing for computing a new, restored image F by means of subtracting ε·∇J from the restored image F. A convergence parameter computation section sets the convergence parameter ε as a value which first shows an increase and subsequently a decrease depending on the number of iterations, thereby increasing the speed of convergence and inhibiting divergence.

12 Claims, 8 Drawing Sheets

IMAGE-PROCESSING SYSTEM AND IMAGE-PROCESSING PROGRAM

CROSS REFERENCE TO RELATED APPLICATIONS

This application claims priority to Japanese Patent Application No. 2006-182258 filed on Jun. 30, 2006, which is incorporated herein by reference in its entirety.

FIELD OF THE INVENTION

The present invention relates to image processing, and more particular, to a technique of restoring an image deteriorated by hand movement, or the like, during capture of an image.

BACKGROUND OF THE INVENTION

In the past, in order to correct for deterioration from hand movements during capture of an image, processing was performed for restoring an image free from hand movements by means of actuation of an optical lens or subjecting a captured image to processing. When an image is restored through image processing, a deterioration in the image can be expressed as $$G = HF + N,$$

provided that an original image is taken as F, a deterioration function as H, addition noise as N, and a deteriorated image as G. Consequently, at the time of restoration of an image, an equation of $F=(G-N)/H$ is solved. When the size of the image is defined as M×N, the deterioration function H comes to a matrix of a size (M×N)×(M×N), and difficulty is encountered in carrying out actual computation. For this reason, there have been proposed various methods; namely, a method for converting a deterioration function into a diagonal matrix by means of Fourier transform and performing computation through use of the diagonal matrix, a technique for carrying out iterative operations of a steepest-descent method in an image space, and the like. In addition to including the steepest-descent method, examples of the iterative technique also include a moment method, a corrected moment method, a conjugate gradient method, and the like.

Japanese Patent Publication Laid-Open No. 2002-288653 and "New Edition of Image Analysis Handbook" (under general editorship of Mikio TAKAGI, University of Tokyo Press, September 2004) provide descriptions of a residue being computed every iteration when an image is restored by means of the iterative technique and iterative computation being determined to converge when the rate of a change in a previous residue and the rate of a change in a current residue have been the threshold value or less.

However, according to the steepest-descent method, convergence of iterative computation becomes slow in the neighborhood of an optimum solution. In order to acquire sufficient image quality, a large number of iterations must be performed.

The moment method and the corrected moment method need large memory capacity, because previous updated vectors must be retained.

The conjugate gradient method is considered to be an iterative method which effects convergence at the highest speed. However, memory capacity increases for the same reason.

The steepest-descent method will be described hereunder.

SUMMARY OF THE INVENTION

Accordingly, the present invention provides an image processing system which enables completion of an iterative operation at sufficient speed while the image quality of a restored image is maintained.

The present invention provides an image-processing system for restoring an image F by a deterioration function H determined by a captured condition and deteriorated image G, the system including an arithmetic section which computes, as an evaluation value J, a difference between the deteriorated image G and an image HF acquired by the image F operated the deterioration function H and which repeatedly performs processing for computing the image F and the evaluation value J until a gradient of the evaluation value J is the threshold value or less, and a parameter setting section which sets a convergence parameter multiplied by the gradient to thus adjust the number of iteration operations and sets the convergence parameter to a value which shows an increase and subsequently a decrease depending on the number of iterations.

Moreover, the present invention provides an image-processing system for restoring an image F by means of an iterative method complying with a steepest-descent method from a deteriorated image G and a deterioration function H determined by a capture, the system including a first storage section for storing the deteriorated image G, a second storage section for storing the restored image F, a section for computing the deterioration function H, a first operation section which computes the evaluation value J according to $J=\|G-HF\|^2$ and further computes $\nabla J$ corresponding to a gradient of the evaluation value J from the deteriorated image G, the restored image F and the deterioration function H, a second operation section for computing a square of norm of $\nabla J$, a comparison section for comparing the square of norm of $\nabla J$ with a threshold value, a control section, in case the square of norm of $\nabla J$ is the threshold value or less, it outputs a restored image as a restoration-completed image, in the other it updates a restored image which subtracts the multiplication $\nabla J$ and the convergence parameter $\epsilon$ from the restored image F, and a third operation section for computing the convergence parameter $\epsilon$ as a value which shows an increase and subsequently a decrease depending on the number of iterations.

Further, the present invention is an image-processing program for a restoration on a computer by an iterative method complying with a steepest-descent method from the deteriorated image G and the deterioration function H determined by capturing (a) a step of computing the evaluation value J from the deteriorated image G, the restored image F, and the deterioration function according to $J=\|G-HF\|^2$, (b) a step of computing $\nabla J$ corresponding to a gradient of the evaluation value J, (c) a step of computing a square of norm of $\nabla J$, (d) a step of comparing the square of norm of $\nabla J$ with a threshold value, (e) a step of computing a new restored image F by means of subtracting, from the restored image F, a value determined by multiplication of $\nabla J$ by the convergence parameter $\epsilon$ when the square of norm of $\nabla J$ exceeds the threshold value, and (f) a step of repeatedly performing processing pertaining to (a) to (e) until the square of norm of $\nabla J$ is the threshold value or less, wherein the convergence parameter $\epsilon$ is a value which shows an increase and subsequently a decrease depending on the number of iteration operations.

The present invention enables retaining restored image quality with increasing the speed of convergence of iterative operations. The present invention can be applied to de-blurring a fuzzy image by handshake on a digital camera, and enables acquisition of a superior restored image in a comparatively short period of time.

The invention will be more clearly comprehended by reference to the embodiment provided below. However, the scope of the invention is not limited to those embodiments.

BRIEF DESCRIPTION OF THE DRAWINGS

A preferred embodiment of the present invention will be described in detail based on the following figures, wherein.

DETAILED DESCRIPTION OF THE PREFERRED EMBODIMENT

An embodiment of the present invention will be described hereinbelow by reference to the drawings while a case where a deteriorated image captured by a digital camera is restored is taken as an example.

Basic Configuration

Figure 1:
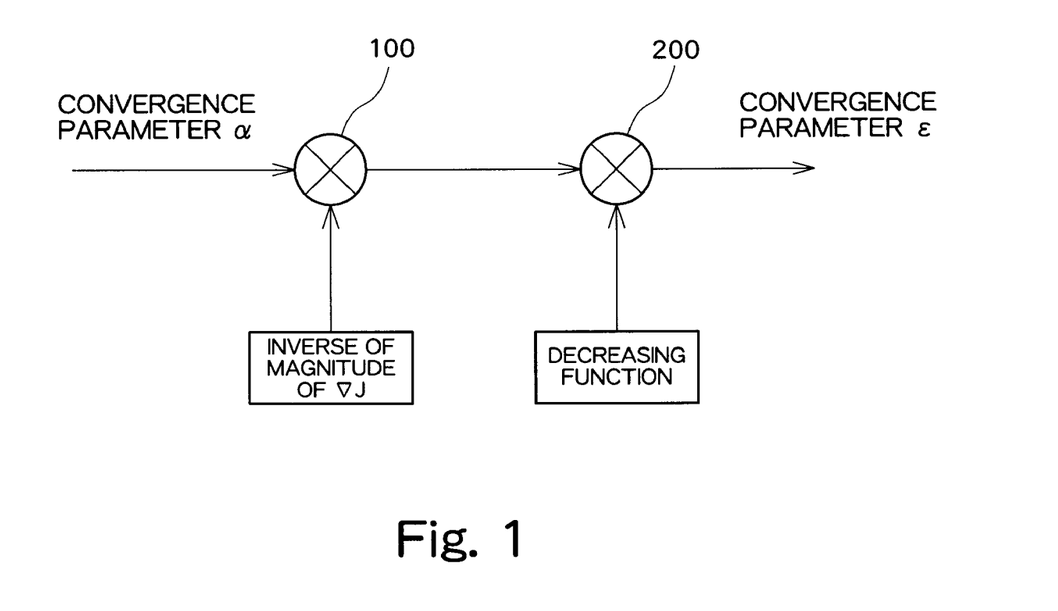
FIG. 1 is a basic block diagram of an embodiment of the present invention.

FIG. 1 shows the basic configuration of the present embodiment. In the present embodiment, when an original image is restored from a deteriorated image by means of the steepest descent method, a convergence parameter ε is incremented or decremented depending on the number of iterations rather than depending on a constant. As mentioned above, under the steepest-descent method, iterative operations are performed until the square of norm of ∇J, which is a gradient of the evaluation value J is a threshold value Thr or less. When the square of norm of ∇J is more than the threshold value Thr, an image created by subtraction of ε∇J from the current restored image F is set as a restored image F. Hence, the convergence parameter εserves as an index which is an extent to which a new restored image is to be set. In order to converge the iterative operations in smaller times or a shorter time, it is better to set ε a greater value to increase ε∇J, the amount of subtraction from the current restored image F. However, a mere increase in the convergence parameter ε is caused by a divergence, not to converge on an optimum solution, or a convergence on pseudo solution. Accordingly, there is a necessity for setting the convergence parameter ε to a smaller value in order to prevent divergence of the parameter, as well as a necessity for setting the convergence parameter ε to a greater value. In the present embodiment, in order to satisfy the two requirements, the convergence parameter ε is incremented or decremented depending on the number of iterations. When the number of iterations is relatively small, the convergence parameter is increased. In contrast, when the number of iterations has increased, the convergence parameter is abruptly set to a smaller value in order to prevent the divergence.

As shown in FIG. 1, the convergence parameter setting section for setting a convergence parameter has a first multiplication circuit 100 and a second multiplication circuit 200.

The first multiplication circuit 100 receives an input of a default convergence parameter α; namely, a convergence parameter α of a constant value and multiplies the convergence parameter by a certain value to thus generate a convergence parameter which increments depending on the number of iterations. A value multiplied by the parameter α may be an arbitrary value, so long as the value increases with the number of iterations. In the present embodiment, the inverse of magnitude of ∇J; i.e., the inverse of the square of norm of ∇J, is used as a value which increases depending on the number of iterations. Restoration proceeds as the number of iterations increases, and as a result the square of norm of ∇J becomes smaller. Hence, the inverse of the square of norm of ∇J increases with an increase in the number of iterations. Moreover, the square of norm of ∇J is a value which must be computed for comparison with the threshold value Thr. So long as the value can be used without computation of a new value, the configuration of the convergence parameter section can be simplified. As a matter of course, the inverse of norm of ∇J rather than the inverse of the square of norm of ∇J may also be used. If a value determined by multiplying the convergence parameter α by the inverse of the square of norm of ∇J is used in unmodified form, there is a possibility of the iterative operations diverging. For this reason, a multiplication result of the first multiplication circuit 100 is output to the second multiplication circuit 200.

The second multiplication circuit 200 generates a convergence parameter, which decreases to depend on the number of iterations in case of a value multiplied a result of the first and a certain value. Such a value is an arbitrary value which decreases depending on the number of iterations, particularly a value which abruptly decreases when the number of iterations becomes great. Such a value is determined as a decreasing function when the number of iterations n is taken as an independent variable. An example decreasing function is $$y = C - A^{n/B},$$

where A, B, and C denote constants. For instance, on the assumption of A=2.2, B=70, and C=1, we have $$y = 1 - 2.2^{n/70}.$$

Since the value of y is zero or over, the value is clipped to 0 when the value of y is zero or less. As a matter of course, this is an instance of the decreasing function. Application of an arbitrary function which decreases with the number of iterations n is feasible. The second multiplication circuit 200 multiplies such a value by the multiplication result of the first multiplication circuit 100, to thus generate a final convergence parameter ε.

Figure 2:
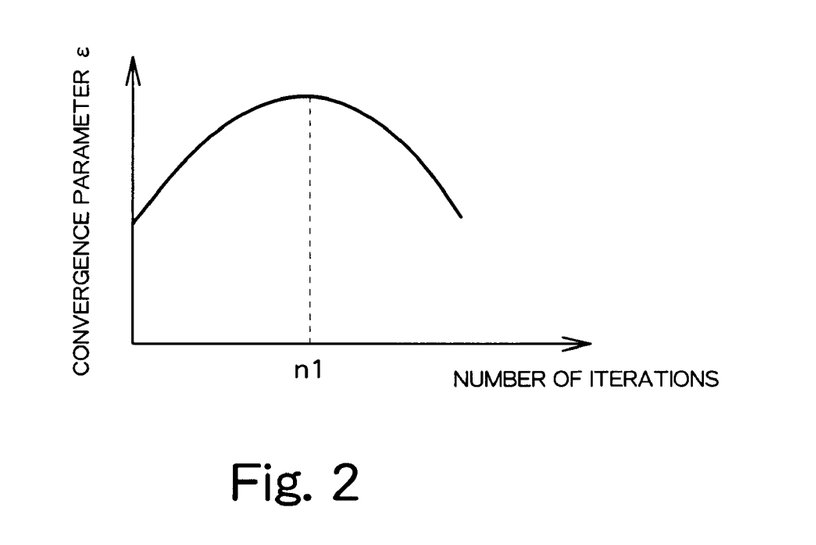
FIG. 2 is a basic characteristic property of a convergence parameter employed in the present embodiment.

FIG. 2 shows a property of the convergence parameter ε generated by the first multiplication circuit 100 and the second multiplication circuit 200. The number of iterations n increases up to a certain value n1 depending on the number of iterations n. In contrast, having more than n1, the number of iterations n decreases depending on the number of iterations n. Until the convergence parameter ε increases up to the number of iterations n equals to n1, the restored image F is sequentially updated much, and convergence of iterative operations becomes fast. Meanwhile, when the number of iterations n has become more than n1, the convergence parameter ε becomes smaller. Accordingly, divergence of the iterative operations is suppressed, whereby convergence of the iterative operations to an optimum solution is facilitated.

In FIG. 1, a final convergence parameter ε generates by the operation twice on the convergence parameter α or it is possible to generate ε the property such as that shown in FIG. 2 by the single operation. Alternatively, it may also be possible to simply store convergence parameters, in the form of a map, in memory without operation and to acquire a convergence parameter ε by reference to the memory. Such a map is a one-dimensional map which defines a correspondence between the number of iterations n and the convergence parameter ε. Parameters are defined as a convergence parameter ε1 for a case where the number of iterations is one, a convergence parameter ε2 for a case where the number of iterations is two, and the like.

A property shown in FIG. 2 can be generally defined as a convex function or a function of which a second order differential becomes negative. The number of iterations n1 indicated as a point of inflection at which the convergence parameter shifts from an increase to a decrease, the gradient of an increase, and the gradient of a decrease can be set arbitrarily. However, setting the gradients in accordance with a property of an image and a characteristic of a deterioration function is preferable. The deterioration function H is defined as PSF. When deterioration is caused by camera shake, the PSF can be expressed as a matrix showing a locus of point-source light on a CCD. Specifically, a plane of photoelectric conversion of the CCD is taken as an X-Y plane, and the locus of point-source light by camera shake is expressed as brightness of the point-source light in the X-Y plane. PSF matrix is large due to substantial camera movement. The degree of camera shake can be evaluated by the number of matrix components. The more camera moves in addition to the number of matrix components (a matrix size), the more the iteration operation for the restoration is required. Accordingly, a matrix size representing a PSF is computed, and at least any one of A, B, and C on the equation is adaptively set in accordance with the matrix size. For instance, the coefficient A is set to large as the matrix size increases.

Detailed Configuration

Figure 3:
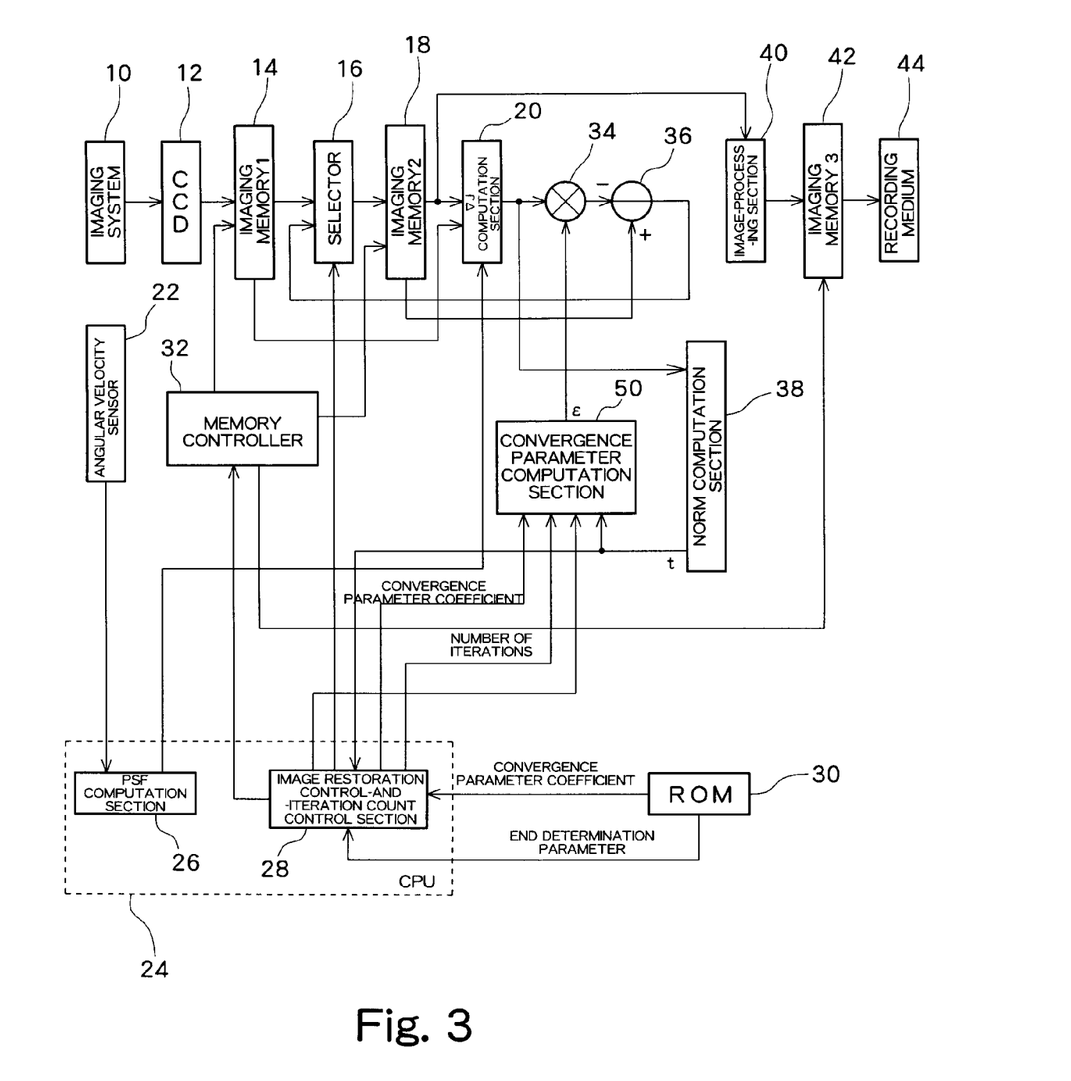
FIG. 3 is a block diagram of a digital camera of the present embodiment.
Figure 9:
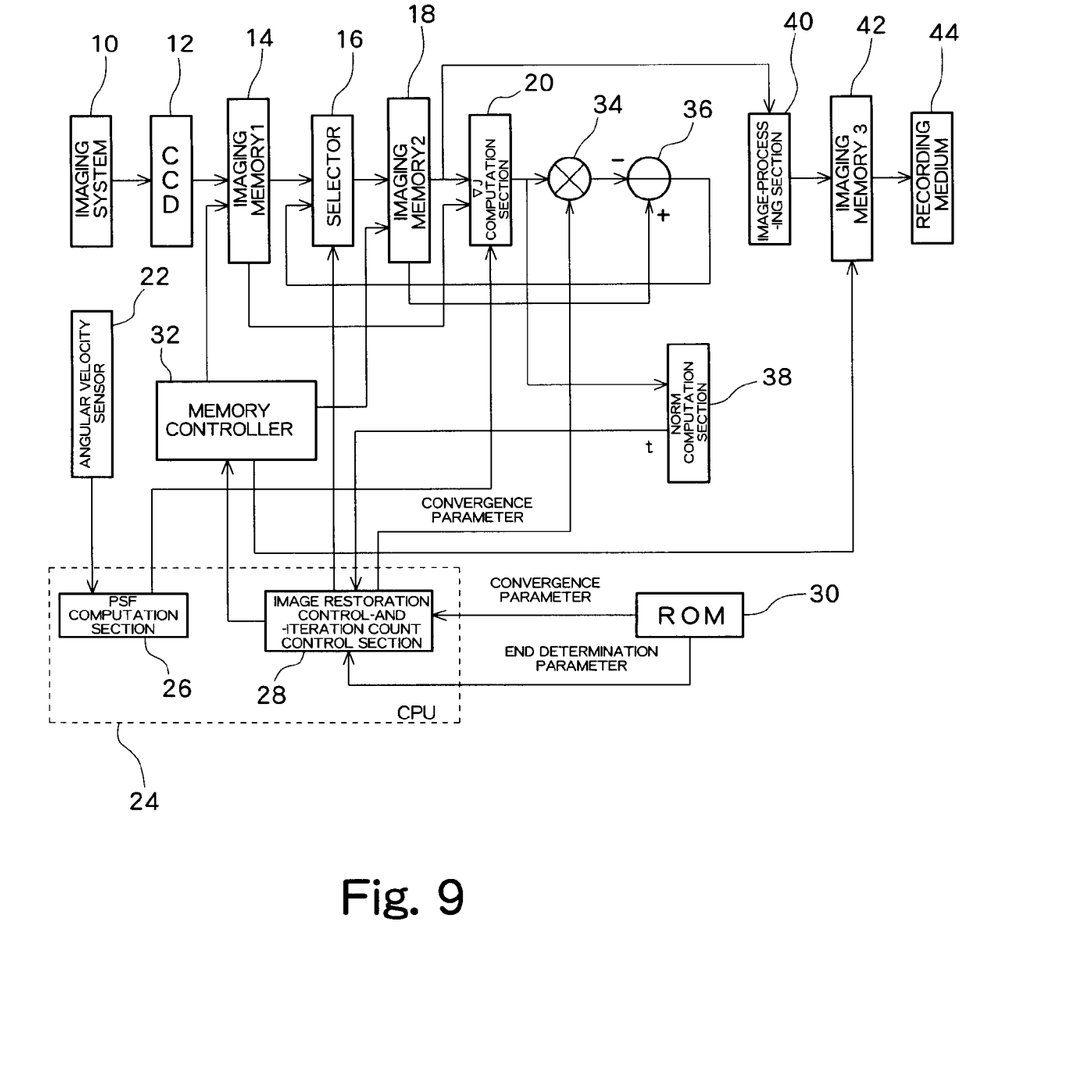
FIG. 9 is a block diagram of a digital camera having an image restoration function.

FIG. 3 shows a detailed configuration of the digital camera of the present embodiment. Those elements which are the same as those of a configuration shown in FIG. 9 are assigned the same reference numerals.

An imaging optical system 10 includes a lens, a shutter, an aperture and the like, and forms an image of a subject on a CCD 12. The lens may also be a monofocal lens or a zoom lens. The imaging optical system may be a single optical system or multiple optical systems. In the case of multiple optical systems, a first imaging optical system forms an image of a subject on a first CCD, and a second imaging optical system forms an image of the subject on a second CCD. The first imaging optical system and the second imaging optical system may have the same focal length or different focal lengths. The imaging optical system 10 may also have an optical camera shake correction mechanism for correcting camera shake by means of actuating the lens in biaxial directions, namely, the direction of an optical system and the direction perpendicular to the direction of the optical axis. In the present embodiment, camera shake is principally corrected by image processing. However, optical camera shake correction and camera shake correction by image processing may also be used in combination or in a complementary manner.

The CCD 12 converts the image of the subject as an analogue image signal and outputs it. The CCD 12 is an example of an image sensor, and a CMOS can also be used as an image sensor. After having been converted into a digital signal by an unillustrated analogue-to-digital converter, the analogue image signal from the CCD 12 is stored in image memory 14. The image stored in the image memory 14 is an image G having been deteriorated by camera shake having arisen during picture taking. Writing or reading image data into or from the image memory 14, and into or from image memory 18 and image memory 42, which are subsequent thereto, is controlled by a memory controller 32. Pursuant to a command from a CPU 24, the memory controller 32 controls the respective image memories 14, 18, and 42. The image memory 14 outputs the deteriorated image G to a selector 16 or to a ∇ (nabla) computation section 20.

A deteriorated image from the image memory 14 and a differential value from a difference circuit 36 are input to the selector 16, and the selector 16 selectively outputs either of the two inputs. Specifically, when the deteriorated image G is set as an initial restored image, the captured-deteriorated image G is outputted and stored in the image memory 18. When the number of iterations is one or more, the restored image F from the differential circuit 36 is outputted and stored in the image memory 18. The image memory 18 outputs the stored, restored image F to the ∇J computation section 20 and to the difference circuit 36. Moreover, when restoration operation has been completed, the restored image F is output as a restored image to an image-processing section 40.

The ∇J computation section 20 computes ∇J from the deteriorated image G from the image memory 14 and the restored image F from the image memory 18. Reference symbol J denotes the evaluation value. Under the assumption of a deteriorated image G, a restored image F, and a deterioration function H, J is determined as $$J=\|G-HF\|^2.$$

On the steepest-descent method, processing for computing a restored image, processing for computing the evaluation value J, processing for computing ∇J, processing for computing the square of norm of ∇J, and processing for comparing the square of norm of ∇J with the threshold value are repeatedly performed until the magnitude of ∇J (or gradJ) which is a gradient of the evaluation value J; namely, the square of norm of ∇J, is the threshold value or less. At a point in time when the magnitude of ∇J has been the threshold value or less, the iterative operations are completed to thus enable acquisition of a restored image F. Performing iterative operations infinitely until the square of norm of ∇J is the threshold value or less is not practical. The maximum number of iterations is usually set, and the iterative operations are completed upon achievement of the maximum number of iterations. The maximum number of iterations is set, as appropriate, depending on a technical field to which the present invention is applied or processing capability of a CPU.

The ∇J computation section 20 computes the evaluation value J from the deteriorated image G from the image memory 14, the restored image F from the image memory 18, and a PSF computed by a PSF (Point Spread Function) computation section 26 of the CPU 24 as a result of an angular velocity sensor 22 having detected an angular velocity of the digital camera induced by camera shake of the user during imaging operation; namely, the deteriorated function H; and further computes ∇J. The PSF is defined by means of expressing, as a matrix, the locus of point-source light on the CCD 12 detected depending on the angular velocity. The greater the camera shake, the more complicated the locus. The number of matrix components used for expressing the locus; namely, a matrix size, is also increased. The computed $\nabla J$ is output to a norm computation section 38 and a multiplication circuit 34. The PSF computation section 26 outputs the computed PSF to the $\nabla J$ computation section 20. The matrix size is compared with a predetermined threshold value. When the matrix size has exceeded the threshold value, processing may also be aborted for reasons of a considerable increase in the number of iterations. In this case, the CPU 24 marks the captured, deteriorated image G as an image which is impossible to be corrected through camera shake correction, and stores the deteriorated image G in the image memory 42 and further in a recording medium 44.

The norm computation section 38 computes the square of norm of $\nabla J$; namely, the magnitude of $\nabla J$; and outputs the computed magnitude of $\nabla J$ to an image restoration control-and-iteration count control section 28 of the CPU 24. The image restoration control-and-iteration count control section 28 compares the received square of the norm of $\nabla J$ with the threshold value Thr, thereby determining whether or not the received square is equal to or less than the threshold value Thr. The threshold value Thr is previously stored in the ROM 30 as an end determination parameter. When the received square of the norm of $\nabla J$ is equal to or less than the threshold value Thr, the norm of $\nabla J$ is deemed to have converged on a sufficiently small, optimum solution, and the iterative operations are completed. The CPU 24 reads from the image memory 18 the restored image F achieved at that time, i.e., the restored image F stored in the image memory 18 is output, restored image F is supplied to the image-processing section 40, and further, the image is stored into the image memory 42. The user visually ascertains the restored image F stored in the image memory 42 by means of an LCD, or the like, provided on the back of the digital camera, or transmits the restored image F to a printer connected to the digital camera to thus create a printout.

Meanwhile, when the square of norm of $\nabla J$ has exceeded the threshold value Thr, restoration has not yet been sufficiently achieved, and iterative operations are continued. At this time, in order to complete iterative operations within a finite time, a convergence parameter computation section 50 computes the convergence parameter $\epsilon$ and supplies the computed parameter to the multiplication circuit 34.

The multiplication circuit 34 multiplies $\nabla J$ by the convergence parameter $\epsilon$, and outputs a result of multiplication to the difference circuit 36. The difference circuit 36 subtracts $\epsilon \nabla J$ from the image data from the image memory 18, namely, the current restored image F to thus compute a new restored image F, and outputs the new restored image F to the selector 16. The selector 16 stores the new restored image into the image memory 18.

Although the convergence parameter computation section 50 computes the convergence parameter $\epsilon$ used for computing a new restored image F, as mentioned previously, the convergence parameter computation section 50 computes the convergence parameter $\epsilon$ in such a manner that the parameter increases with the number of iterations n until the number of iterations n comes to a certain, constant number and such that the parameter decreases with the number of iterations n when the number of iterations n has exceeded the certain, constant number. Specifically, as shown in FIG. 1, the convergence parameter $\epsilon$ is computed by means of multiplying the coefficient $\alpha$ by a first function and a second function in sequence. The coefficient $\alpha$ has been stored in advance in the ROM 30 as a convergence parameter coefficient. The image restoration control-and-iteration count control section 28 of the CPU 24 reads the coefficient $\alpha$ from the ROM 30, and outputs the constant to the convergence parameter computation section 50. The first function is a monotonously increasing function of the number of iterations, and the second function is a monotonously decreasing function of the number of iterations. The convergence parameter computation section 50 has the two multiplication circuits 100 and 200, and performs arithmetic operation (the coefficient $\alpha \times$ the first function $\times$ the second function). Specifically, the first function corresponds to the inverse of the square of norm of $\nabla J$, and the second function corresponds to $y=1-2.2^{n/70}$.

Figure 4:
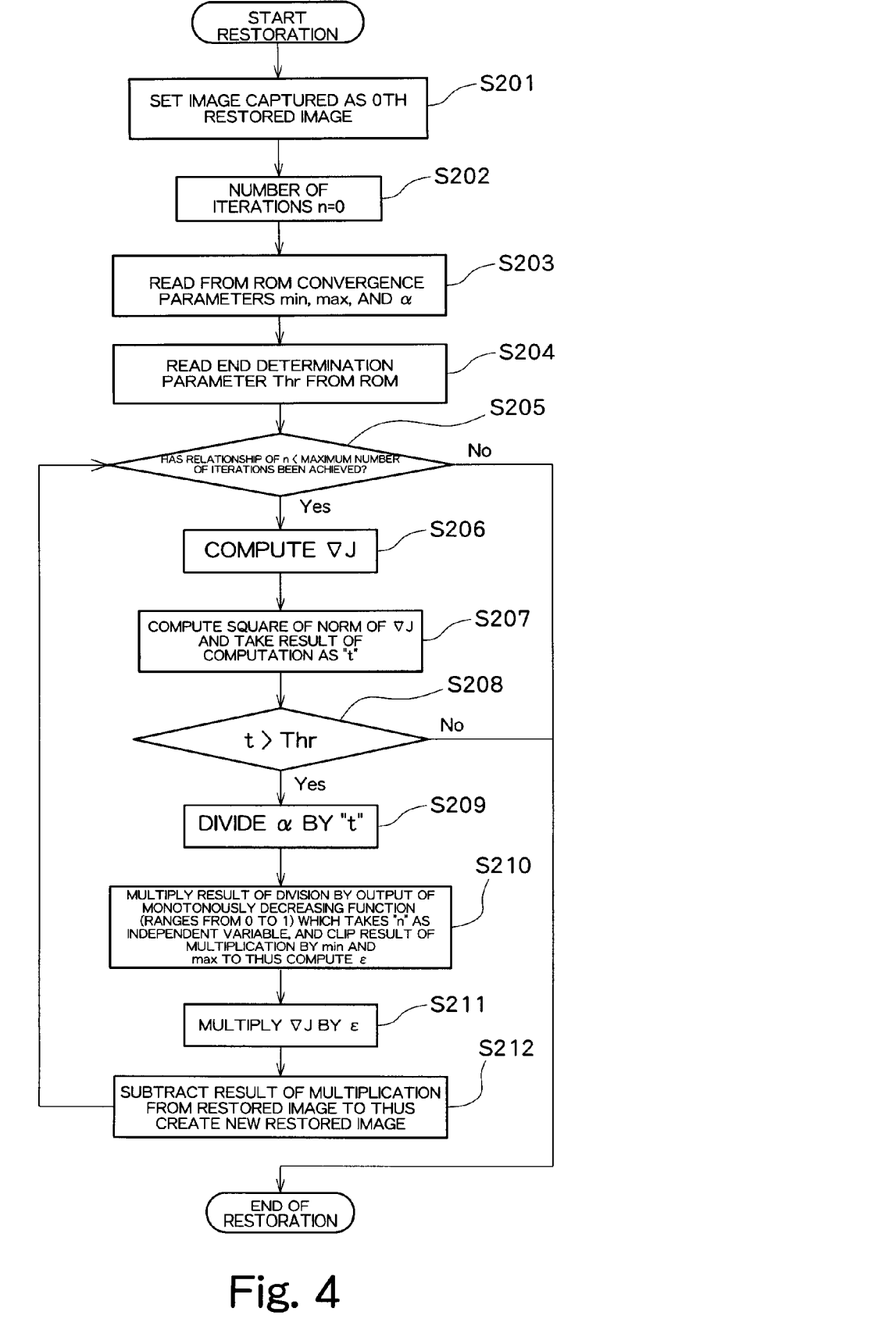
FIG. 4 is a detailed processing flowchart of the present embodiment.

FIG. 4 shows a flowchart of processing for restoring an image by means of the steepest-descent method of the present embodiment. First, the deteriorated image G captured by means of photographing is stored as the $0^{th}$ restored image, namely, an image which has not been restored, in the image memory 14. The image is further stored in the image memory 18 by way of the selector 16 (S201).

Next, a parameter n showing the number of iterations is initialized to zero (S202), and the convergence parameter coefficient $\alpha$, min, and max are read from ROM 30 (S203). Here, reference symbol min denotes the lower limit value to be assumed by the convergence parameter $\epsilon$, and reference symbol max denotes the upper limit value to be assumed by the convergence parameter $\epsilon$. For instance, the lower limit value is one. Moreover, the threshold value Thr is read as an end determination parameter from the ROM 30 (S204).

Next, a determination is made as to whether or not the number of iterations n exceeds the predetermined maximum number of iterations (S205). When the number of iterations n is smaller than the maximum number of iterations, $\nabla J$ is computed (S206). Specifically, the evaluation value J is computed from the deteriorated image F supplied from the image memory 14, the restored image F (in the first computation the restored image F is equal to the deteriorated image G) supplied from the image memory 18, and the PSF supplied from the PSF computation section 26, namely, the deterioration function H, and $\nabla J$ is further computed. $\nabla J$ is computed by an equation of $\nabla J = -2H^T(G-HF)$.

Subsequently, the square of norm of $\nabla J$ is computed, and the computed square is taken as a parameter t (S207). The computed parameter t is output to the CPU 24, and the image restoration control-and-iteration count control section 28 of the CPU 24 compares the parameter t with the threshold value Thr, to thus determine whether or not the parameter t exceeds the threshold value Thr (S208). When the parameter t has exceeded the threshold value Thr, restoration is determined not to have been sufficiently achieved yet, and processing proceeds to processing for computing a new restored image. Specifically, there is performed processing for computing the convergence parameter $\epsilon$, multiplying $\nabla J$ by the convergence parameter $\epsilon$, and subtracting a result of multiplication from the current restored image F. To compute the convergence parameter $\epsilon$, the coefficient $\alpha$ is first divided by the parameter t (S209). As a matter of course, this division is equivalent to multiplying the coefficient $\alpha$ by the inverse of the square of norm of $\nabla J$. Next, a result of division is multiplied by an output of the monotonous decreasing function y which takes the number of iterations n as an independent variable (S210). When a result of multiplication exceeds the upper limit max of the convergence parameter $\epsilon$, the convergence parameter $\epsilon$ is taken as the result of multiplication. When the result of multiplication is the lower limit min of the same or less, the result of multiplication is replaced with (clipped at) the lower limit value min (S210). After computation of the convergence parameter $\epsilon$, $\nabla J$ is multiplied by the convergence parameter $\epsilon$ (S211) to thus subtract $\nabla J$ from the current restored image F, thereby computing a new restored image (S212). Processing pertaining to S205 to S212, namely, processing for computing $\nabla J$, processing for computing the square of norm with $\nabla J$, processing for comparing the computed square with the threshold value, processing for computing the convergence parameter $\epsilon$, and processing for computing a new restored image F, are repeatedly performed until the parameter t is the threshold value Thr or less. When the parameter t has been the threshold value Thr or less, or when the maximum number of iterations has been achieved even in a case where the parameter t is not the threshold value Thr or less, processing is completed. At the time of completion of processing, the restored image F achieved at that time is supplied from the memory 18 to the image-processing section 40. The restored image F undergoes various processing operations, such as $\gamma$ correction, white balance adjustment, edge enhancement processing, and the like, in the image-processing section 40, and the processed image is stored in the image memory 42.

Figure 5:
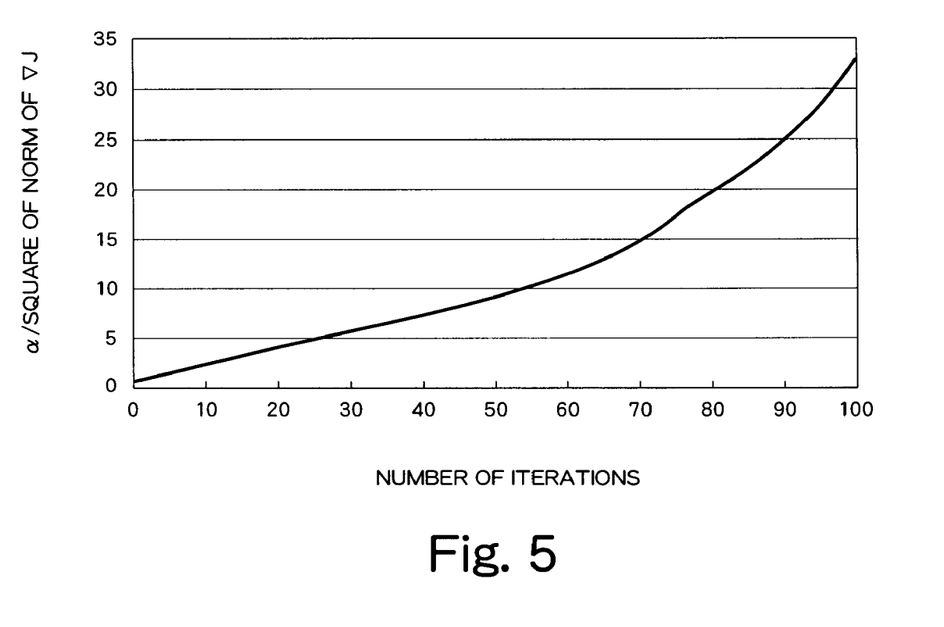
FIG. 5 is a graph showing a relation between the number of iterations and α/(the square of norm of ∇J)

FIG. 5 shows a characteristic of a value acquired by dividing the coefficient $\alpha$ computed in S209 shown in FIG. 4 by the parameter t. In the drawing, the horizontal axis represents the number of iterations n, and the vertical axis represents the square of norm of $\alpha/\nabla J$ (i.e., the parameter t). Since the parameter t decreases in conjunction with the number of iterations, the square of norm of $\alpha/\nabla J$ increases in conjunction with the number of iterations.

Figure 6:
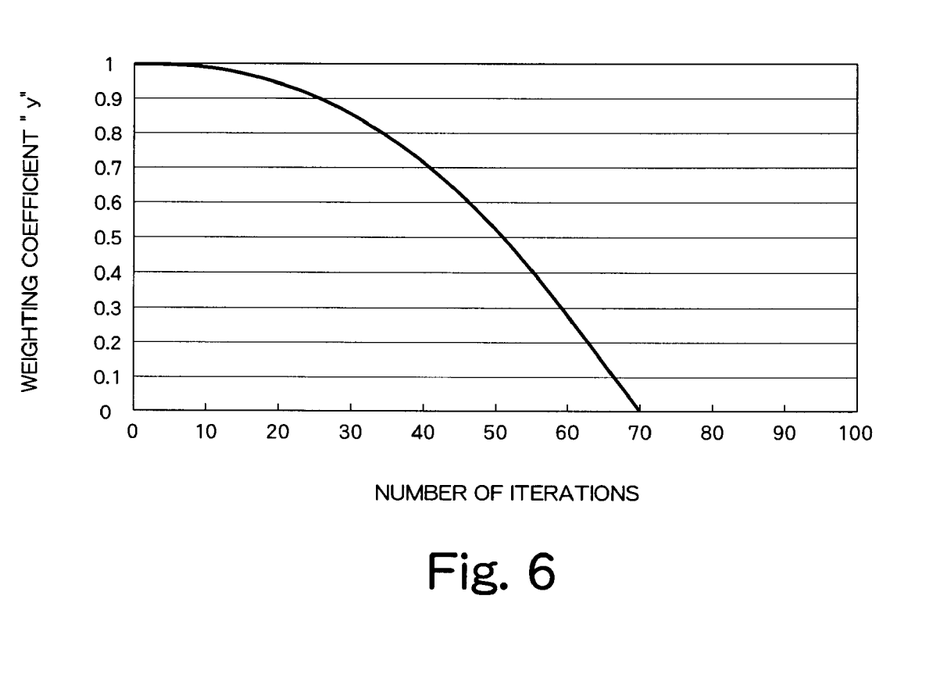
FIG. 6 is a graph showing a relation between the number of iterations and a weighting coefficient y.

FIG. 6 shows a monotonously decreasing function used in S210 shown in FIG. 4. In the drawing, the horizontal axis represents the number of iterations n, and the vertical axis represents the function value y (a weighting coefficient multiplied by the coefficient $\alpha$). The function is defined by $y=1-2.2^{n/70}$. When y<0 is achieved, the function is replaced with y=0.

Figure 7:
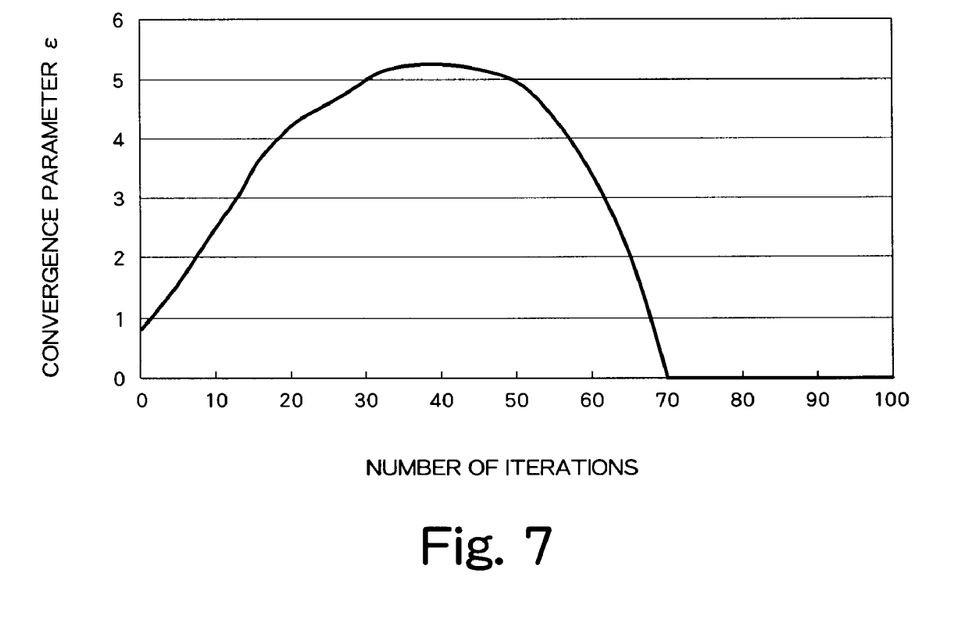
FIG. 7 is a graph showing a relation between the number of iterations and α/(the square of norm of ∇J)·y.

FIG. 7 shows a product (the coefficient $\alpha$·the inverse of square of norm of $\nabla J$·the monotonously decreasing function y) computed in S210. The coefficient $\alpha$ is multiplied by two function values, thereby acquiring a value which first shows an increase and subsequently a decrease with an increase in the number of iterations.

Figure 8:
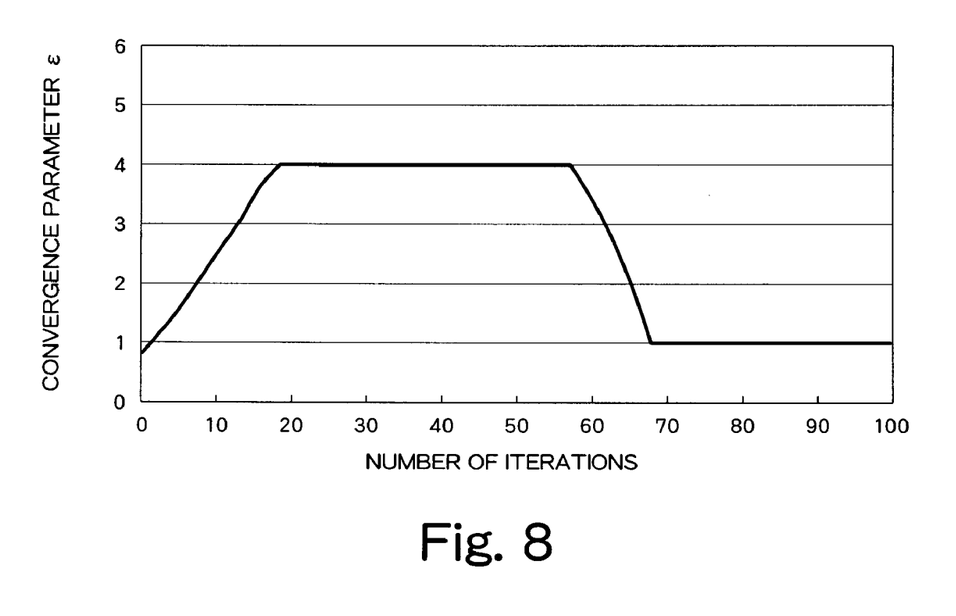
FIG. 8 is a graph showing a relation between the number of iterations and a convergence parameter ε.

FIG. 8 shows a characteristic of the final convergence parameter $\epsilon$. The parameter is determined by means of clipping the value shown in FIG. 7 by the upper limit value max and the lower limit value min, where the upper limit value max is four and the lower limit value min is one.

As mentioned above, in the present embodiment, the convergence parameter $\epsilon$ is set as a characteristic, such as that shown in FIG. 8, so that an increase in convergence speed and inhibition of divergence can be attained. The applicant of the present patent application has ascertained that, when compared with the case where the convergence parameter $\epsilon$ is taken as a constant, an essentially-equal restored image is obtained with the same processing capability in about half the time.

FIG. 9 shows the configuration of a digital camera to restore an original image from a deteriorated image captured by itself on the steepest-descent method.

An imaging optical system 10 included in a lens, a shutter, an aperture, and the like, and as forms an image of a subject on a CCD 12. The CCD 12 converts the image of the subject into an image signal and outputs the converted image. After having been converted into a digital signal, an analogue image signal from the CCD 12 is stored in image memory 14. The image memory 14 outputs image data to a selector 16 or a $\nabla J$ (nabla) computation section 20 as described previously. The selector 16 selectively outputs either image data from the image memory 14 or a differential value from a differential circuit 36 as described previously. An output from the selector 16 is stored in image memory 18. The image memory 18 outputs image data to the $\nabla J$ computation section 20. The $\nabla J$ computation section 20 computes $\nabla J$ of image data from the image memory 14 and $\nabla J$ of image data from the image memory 18, where reference symbol J denotes the value of evaluation of a general inverted filter and is defined as $J=\|G-HF\|^2$, provided that a deteriorated image is taken as G, a restored image is taken as F, and a deterioration function is taken as H. The equation signifies that the value of evaluation J is determined as the magnitude of a difference between an image HF acquired by application of the deterioration function H to the restored image F and an actual deteriorated image G. When the restored image has been properly restored, a relationship of HF=G is theoretically achieved, and the value of evaluation comes to zero. The smaller the value of evaluation J, the better the restoration of the restored image F. According to the steepest-descent method, iterative operations are repeated until $\nabla J$, the gradient of J, namely, a square of the norm of $\nabla J$, is the threshold value or less. At a point in time when the square of the norm has been the threshold value or less, iterative operations are terminated to thus acquire a restored image F.

The $\nabla J$ computation section 20 computes the value of evaluation J from the image data (the deteriorated image G) from the image memory 14, the image data (the restored image F) from the image memory 18, and a PSF (Point Spread Function) from a PSF computation section 26 of a CPU 24, namely, the deterioration function H, and further computes $\nabla J$. The PSF is calculated from an image magnification of the imaging system and an angular velocity detected by an angular velocity sensor 22. The computed $\nabla J$ is output to a norm computation section 38 and a multiplication circuit 34. The norm computation section 38 computes the square of the norm of $\nabla J$, namely, the magnitude of $\nabla J$, and outputs the computed magnitude of $\nabla J$ to an image restoration control-and-iteration count control section 28 in the CPU 24. The image restoration control-and-iteration count control section 28 compares the square of the norm of $\nabla J$ with the threshold value, thereby determining whether it is less than the threshold value. If it is the threshold value or less, the norm of $\nabla J$ is on a sufficiently-small, optimum solution and iterative operations are completed. A restored image acquired at that time, namely, image data from the image memory 18 is processed in an image-processing section 40, and the processed image is stored in image memory 42. Subsequently, the image is stored in a recording medium 44, such as flash memory or the like. In contrast, when the square of norm of $\nabla J$ has exceeded the threshold value, an original image is determined not to have been fully restored yet, and iterative operations are continued. At this time, in order to complete iterative operations within a finite time, a predetermined convergence parameter $\epsilon$ is supplied to the multiplication circuit 34 so as to adjust the magnitude of $\nabla J$.

The multiplication circuit 34 multiplies $\nabla J$ by the convergence parameter $\epsilon$, and outputs a result of multiplication to the differential circuit 36. The differential circuit 36 subtracts $\epsilon \nabla J$ from the image data from the image memory 18, namely, the current restored image F, and outputs a result of subtraction to the selector 16. The selector 16 stores an image determined by subtraction of $\epsilon \nabla J$ into the image memory 18 as a new restored image.

Figure 10:
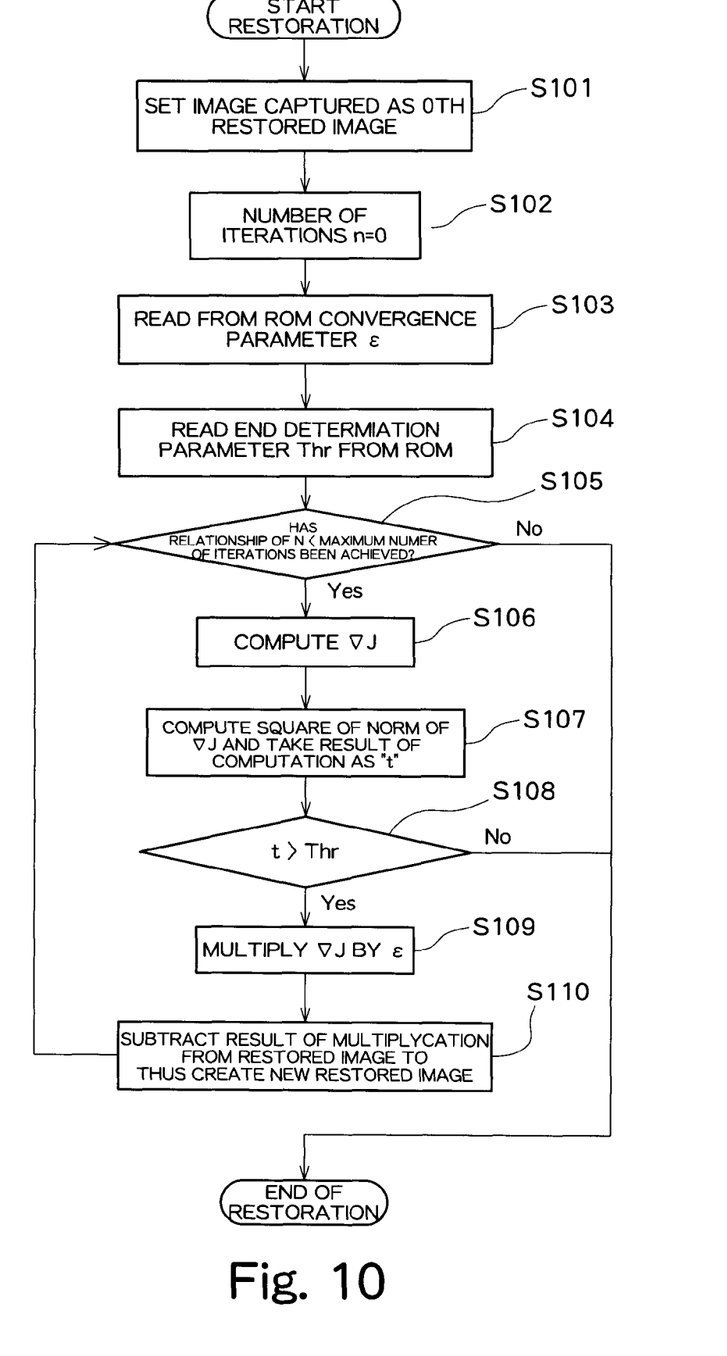
FIG. 10 is a flowchart of image restoration processing.

FIG. 10 shows a flowchart of processing for restoring an image according to the steepest-descent method. First, a deteriorated image captured by photographing is stored in the image memory 14 as the $0^{th}$ restored image, namely, an image which has not been restored at the image memory 18 (S101). Next, a parameter n showing an iteration count is initialized to zero (S102), and the predetermined convergence parameter ε is read from the ROM 30 (S103). Moreover, a threshold value Thr is read from the ROM 30 as a completion determination parameter (S1104). When the iteration count n is smaller than a predetermined maximum iteration count (S 105), ∇J is computed (S 106). The square of the norm of ∇J is computed, and a resultant of computation is taken as a parameter t (S107). A determination is made as to whether or not t has exceeded the threshold value Thr (S108). When t has exceeded the threshold value Thr, restoration of an original image is determined to be still insufficient, and ∇J is multiplied by the convergence parameter (S109). A new restored image is created by subtraction of ε∇J from the restored image (S110). Processing from S105 to S110 is iterated until t is the threshold value Thr or less. When t has been the threshold value Thr or less, or even when the maximum number of iteration operations has been attained before t has not been the threshold value Thr or less, processing is completed.

Figure 11:
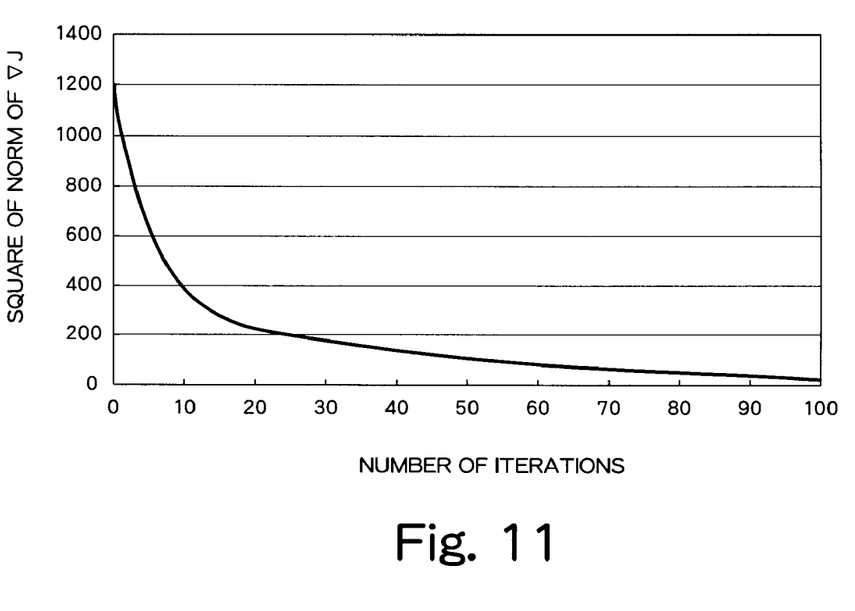
FIG. 11 is a graph showing a relation between the number of iterations and the square of norm of ∇J.

As mentioned above, the number of iteration operations can be reduced to iterations by use of the convergence parameter ε. However, even in this case, the square of the norm of ∇J decreases as to the number of iteration operations, as shown in FIG. 11, but difficulty achieving a convergence as the number of iteration operations increases. It is difficult to say that restoration can be effected at sufficient speed. As a matter of course, an image cannot be restored with sufficient image quality by means of mere speedup of convergence.

Image restoration processing of the present invention can be realized particularly as a camera shake correction function of a digital camera. Specifically, a program used for causing a CPU of the digital camera to execute processing pertaining to the flowchart shown in FIG. 4 is stored in advance as firmware in ROM of the digital camera. The CPU sequentially reads and runs the program, thereby eliminating camera shake from the image captured with camera shake. A so-called RAW image may also be subjected to camera shake correction. Alternatively, an image having undergone JPEG compression may also be subjected to camera shake correction. The user may connect the digital camera to the Internet or the like to thus download a program, thereby upgrading the firmware at any time. Moreover, the user may also be enabled to adjust the coefficient α, the upper limit value max, the lower limit value min, and the coefficients A, B, and C in $y=C-A^{n/B}$. Realizing such an adjustment by way of a user interface appearing on a rear LCD of the digital camera is desirable. For instance, it is desirable that the user interface has a convergence speed priority mode and a restored image quality priority mode, and that parameters are automatically adjusted as a result of the user selecting either of the modes. Moreover, the present embodiment has illustrated the case where a general inverted filter is used as the evaluation value J. Needless to say, the filter can be applied to an arbitrary evaluation value by means of which a difference between the deteriorated image G and the image HF is evaluated, and includes an evaluation value of the Tiknohov-Miller normalization method or the Bays restoration method, by means of which a difference between the deteriorated image G and the image HF is computed.

The image-processing program of the present embodiment can also be installed in electronic equipment other than a digital camera, a personal computer, or the like.

PARTS LIST 10 imaging optical system
12 CCD
14 image memory 1
16 selector
18 image memory 2
20 computation section
22 velocity sensor
24 CPU
26 PSF computation section
28 count control section
30 ROM
32 memory controller
34 multiplication circuit
36 difference circuit
38 norm computation section
40 image processing section
42 image memory 3
44 recording medium
50 parameter computation section
100 first multiplication circuit
200 second multiplication circuit

What is claimed is:

1. A computer program product for restoring an image F by means of a deterioration function H determined from a captured, deteriorated image G and image-capture conditions, the computer program product comprises a computer readable storage medium having a program stored thereon for performing the steps of:
   (a) computing, as an evaluation value J, a difference between the deteriorated image G and an image HF acquired by subjecting the image F to the deterioration function H and which repeatedly performs processing for computing the image F and the evaluation value J until a gradient of the evaluation value J is the threshold value or less; and
   (b) setting a convergence parameter multiplied by the gradient to thus adjust the number of iteration operations and sets the convergence parameter to a value which shows an increase and subsequently a decrease with an increase in the number of iterations.

2. The computer program product according to claim 1, wherein step (a) computes a new image F by computing a difference between the image F and a value which has been determined by multiplication of the gradient by the convergence parameter.

3. The computer, program product according to claim 1, wherein step (b) sets the convergence parameter as a function of the number of iterations.

4. The computer program product according to claim 1, wherein step (b) sets the convergence parameter by use of a product of an increasing function which increases a value depending on the number of iterations and a decreasing function which decreases a value depending on the number of iterations.

5. The computer program product according to claim 4, wherein step (b) sets the convergence parameter, by means of multiplying a constant α by an inverse of square of the gradient and additionally multiplying by a decreasing function that decreases a value depending on the number of iterations.

6. The computer program product according to claim 5, wherein step (b) sets the convergence parameter, by means of multiplying the constant α by the inverse of square of the gradient and additionally multiplying by the decreasing function that leads to $y=C-A^{n/B}$, provided that n denotes the number of iterations and A, B, and C denote positive real numbers.

7. The computer program product according to claim 6, wherein at least any of the constants A, B, and C is set in accordance with a matrix size of the deterioration function H.

8. A computer program product for restoring an image F by means of a deterioration function H determined from a captured, deteriorated image G and image-capture conditions by means of iterative operations complying with a steepest-descent method, the computer program product comprises a computer readable storage medium having a program stored thereon for performing the steps of:

(a) storing the deteriorated image G;

(b) storing the restored image F;

(c) computing the deterioration function H;

(d) computing an evaluation value J from the deteriorated image G, the restored image F, and the deterioration function according to $J=\|G-HF\|^2$ and further computes $\nabla J$ corresponding to a gradient of the evaluation value J;

(e) computing a square of norm of $\nabla J$;

(f) comparing the square of norm of $\nabla J$ with a threshold value;

(g) outputting, as a restoration-completed image, the restored image F when the square of norm of $\nabla J$ is the threshold value or less, computes a new restored image F by means of subtracting, from the restored image F, a value determined by multiplication of $\nabla J$ by the convergence parameter $\epsilon$ when a square of norm of $\nabla J$ exceeds a threshold value, and stores the restored image in the second storage means in an updating manner; and (h) computing the convergence parameter $\epsilon$ as a value which shows an increase and subsequently a decrease depending on the number of iterations.

9. The computer program product according to claim 8, wherein the step (h) computes the convergence parameter $\epsilon$ by use of the square of norm of $\nabla J$.

10. The computer program product according to claim 8, wherein step (h) computes the convergence parameter $\epsilon$ by use of the square of norm of $\nabla J$ and a coefficient which monotonously decreases depending on the number of iteration operations.

11. An image-processing computer program product for causing a computer to perform processing for restoring an image F by means of a deterioration function H determined from a captured, deteriorated image G and image-capture conditions by means of iterative operations complying with a steepest-descent method, the computer program product comprises a computer readable storage medium having a program stored thereon for performing the steps of:

(a) a step of computing the evaluation value J from the deteriorated image G, the restored image F, and the deterioration function according to $J=\|G-HF\|^2$.

(b) a step of computing $\nabla J$ corresponding to a gradient of the evaluation value J;

(c) a step of computing a square of norm of $\nabla J$;

(d) a step of comparing the square of norm of $\nabla J$ with a threshold value;

(e) a step of computing, when the square of norm of $\nabla J$ exceeds the threshold value, a new restored image F by means of subtracting a value determined by multiplication of $\nabla J$ by the convergence parameter $\epsilon$ from the restored image F; and (f) a step of repeatedly performing processing pertaining to (a) to (e) until the square of norm of $\nabla J$ is the threshold value or less, wherein the convergence parameter $\epsilon$ is a value which shows an increase and subsequently a decrease depending on the number of iteration operations.

12. The image-processing computer program product according to claim 11, further comprising:

(g) a step of computing the convergence parameter $\epsilon$ by multiplying a predetermined coefficient $\alpha$ by an inverse of the square of norm of $\nabla J$ and additionally by a coefficient which monotonously decreases depending on the number of iterations.

* * * * *